(12) United States Patent
Murawa et al.

(10) Patent No.: US 11,535,054 B2
(45) Date of Patent: Dec. 27, 2022

(54) TRACK WHEEL AND ELASTIC BODY FOR SUCH A TRACK WHEEL

(71) Applicant: Bochumer Verein Verkehrstechnik GmbH, Bochum (DE)

(72) Inventors: Franz Murawa, Bochum (DE); Torben Schulz, Heiligenhaus (DE)

(73) Assignee: Bochumer Verein Verkehrstechnik GmbH, Bochum (DE)

( * ) Notice: Subject to any disclaimer, the term of this patent is extended or adjusted under 35 U.S.C. 154(b) by 261 days.

(21) Appl. No.: 16/484,955

(22) PCT Filed: Feb. 12, 2018

(86) PCT No.: PCT/EP2018/053376
§ 371 (c)(1),
(2) Date: Aug. 9, 2019

(87) PCT Pub. No.: WO2018/149766
PCT Pub. Date: Aug. 23, 2018

(65) Prior Publication Data
US 2020/0055331 A1 Feb. 20, 2020

(30) Foreign Application Priority Data
Feb. 15, 2017 (DE) .................... 10 2017 103 015.8

(51) Int. Cl.
*B60B 17/00* (2006.01)
(52) U.S. Cl.
CPC ............... *B60B 17/0041* (2013.01)
(58) Field of Classification Search
CPC .......... B60B 17/0041; B60B 17/0034; B60B 17/0027
See application file for complete search history.

(56) References Cited

U.S. PATENT DOCUMENTS

| 1,785,812 | A | * | 12/1930 | Gribben | ............... B60B 17/0034 |
| | | | | | 295/11 |
| 1,840,898 | A | * | 1/1932 | Gunn | ................... B60B 17/0034 |
| | | | | | 295/11 |

(Continued)

FOREIGN PATENT DOCUMENTS

| DE | 829603 C | 1/1952 |
| DE | 1206006 B | 12/1965 |

(Continued)

*Primary Examiner* — Jason R Bellinger
(74) *Attorney, Agent, or Firm* — The Webb Law Firm (57) ABSTRACT

The present invention relates to a multi-part track wheel with a wheel tyre, with a wheel rim and with at least two elastic bodies arranged between the wheel tyre and the wheel rim, via which the wheel tyre is supported spring elastically on the wheel rim and which are arranged distributed in the circumferential direction around the rotary axis of the track wheel, wherein the elastic bodies are clamped between an inner circumferential surface of the wheel tyre and an outer circumferential surface of the wheel rim and in this case abut with their outer side assigned to the wheel tyre on the inner circumferential surface of the wheel tyre and with their inner side assigned to the wheel rim on the outer circumferential surface of the wheel rim and an elastic body for use in a track wheel. The track wheel according to the invention designed according to the one-ring concept provides an optimised low spring constant and the elastic body as an essential component for the spring properties allows the manufacture of a one-ring track wheel with optimised usage properties. This is achieved in that the elastic bodies are locked against a movement in the circumferential direction by forming elements provided in each case on the inner circumferential surface of the wheel tyre and/or on the outer circumferential surface of the wheel rim.

16 Claims, 9 Drawing Sheets

(56) References Cited

U.S. PATENT DOCUMENTS

| | | | | |
|---|---|---|---|---|
| 2,041,490 | A | * | 5/1936 | Runyan ............... B60B 17/0034 295/11 |
| 2,328,600 | A | | 9/1943 | Baggett |
| 2,659,622 | A | * | 11/1953 | Watter ................ B60B 17/0034 295/11 |
| 3,101,214 | A | * | 8/1963 | Talboys .............. B60B 17/0044 295/1 |
| 3,107,115 | A | * | 10/1963 | Kastner ............... B60B 17/0034 295/31.1 |
| 3,980,333 | A | * | 9/1976 | Kasper ................ B60B 17/0041 295/11 |
| 3,986,747 | A | * | 10/1976 | Raquet ................ B60B 17/0041 295/11 |
| 10,112,437 | B2 | | 10/2018 | Landaberea Rodriguez et al. |
| 2008/0217940 | A1 | | 9/2008 | Murawa et al. |

FOREIGN PATENT DOCUMENTS

| | | | | |
|---|---|---|---|---|
| DE | 2951589 | A1 | * 7/1981 | ......... B60B 17/0034 |
| DE | 3315454 | A1 | * 10/1984 | ......... B60B 17/0034 |
| DE | 3318617 | A1 | * 11/1984 | ......... B60B 17/0041 |
| DE | 3328321 | A1 | 2/1985 | |
| DE | 19743893 | A1 | 4/1999 | |
| DE | 102014222072 | A1 | 5/2016 | |
| EP | 0733493 | B1 | 11/2001 | |
| EP | 1896274 | B1 | 12/2008 | |
| EP | 2357092 | A1 | 8/2011 | |
| EP | 2881260 | A1 | 6/2015 | |
| JP | 2009046106 | A | 3/2009 | |
| KR | 101393371 | B1 | 5/2014 | |
| WO | 2014202455 | A1 | 12/2014 | |

* cited by examiner

TRACK WHEEL AND ELASTIC BODY FOR SUCH A TRACK WHEEL

CROSS-REFERENCE TO RELATED APPLICATIONS

This application is the United States national phase of International Application No. PCT/EP2018/053376 filed Feb. 12, 2018, and claims priority to German Patent Application No. 10 2017 103 015.8 filed Feb. 15, 2017, the disclosures of which are hereby incorporated by reference in their entirety.

BACKGROUND OF THE INVENTION

Field of the Invention

The invention relates to a multi-part track wheel with a wheel tyre, with a wheel rim and with at least two elastic bodies arranged between the wheel tyre and the wheel rim via which the wheel tyre is supported spring elastically on the wheel rim and which are arranged distributed in the circumferential direction around the rotary axis of the track wheel, wherein the elastic bodies are clamped between an inner circumferential surface of the wheel tyre and an outer circumferential surface of the wheel rim and in this case abut with their outer side assigned to the wheel tyre on the inner circumferential surface of the wheel tyre and with their inner side assigned to the wheel rim on the outer circumferential surface of the wheel rim.

Similarly, the invention relates to an elastic body for use in a track wheel, which comprises a wheel tyre and a wheel rim and at least two elastic bodies, via which the wheel tyre is supported spring elastically on the wheel rim, wherein the elastic body has a block-shaped base form with end side front sides of which in each case one is assigned to one of the front sides of the track wheel, longitudinal sides extending laterally between the front sides, an outer side assigned to the wheel tyre, also extending between the front sides and meeting at its longitudinal edges with the longitudinal sides and an inner side opposed to the outer side, which is assigned to the wheel rim of the track wheel.

Description of Related Art

Elastically sprung track wheels, often designated as "rubber sprung" track wheels in technical jargon, are known in different constructions.

The so-called one-ring embodiment of such track wheels, in the case of which a ring made of rubber elements forming the suspension is arranged between the wheel tyre and the wheel rim, is for example described in DE 829 603 C and DE 33 28 321 A1. In the case of these track wheels, the rubber elements are largely subjected to pressure stress in the region of the force introduction in the case of the wheel contact force acting radially on the wheel. This pressure stress overlaps the pressure stress of the rubber elements which is generated during the assembly.

Another rubber sprung track wheel is for example known from EP 0 733 493 B1. This known track wheel is constructed from a wheel tyre forged or rolled from steel and a wheel body manufactured from an aluminium alloy or another light metal material comprising the wheel hub via which the track wheel is mounted in use on the axle of the respective rail vehicle. Recesses are provided in the wheel tyre and grooves are provided in the wheel rim to insert rubber rings between the wheel tyre and the circumference of the wheel body. The rubber rings form an elastic body via which the wheel tyre is supported elastically on the wheel rim formed on the circumference of the wheel body. Through a wedge-shaped tension ring provided as the tension element, the rubber rings are tensioned between the wheel body and the wheel tyre. For this purpose, a circumferential section starting from one front side of the wheel body and circulating on its outer circumference is formed, onto which the tension ring is pushed. Fastening screws distributed over its circumference and serving as tension means pull the tension ring towards a circumference section of the wheel rim circulating on the opposing front side. The fastening screws engage on the wheel body for this purpose by being guided aligned axially-parallel to the rotary axis of the track wheel through openings formed into the tension ring and are screwed into threaded openings which are formed in the circumferential section of the wheel body.

Irrespective of the specific embodiment of the track wheels, high pre-tensioning of the rubber bodies (pressure stress) is required in the installation state in order to safely transfer the drive and brake torque occurring in practical use during the driving operation, i.e. without slip movements between the rubber elements and the wheel tyre or the wheel rim of the track wheel.

It must be noted that in the case of conventional track wheels of the type in question here the rubber elements used as elastic bodies between wheel tyre and wheel rim transfer the moments occurring in use exclusively via a force fitting, i.e. exclusively via friction between the elastic elements and the associated outer circumferential surface of the wheel rim and the inner circumferential surface of the wheel tyre.

At the same time, a proportion of the pre-tensioning of the elastic bodies is required in order to compensate the creep and subsidence effects of the rubber elements during their many years of operational use. The total required pre-tensioning of the rubber elements is, according to experience, between 20 and 35% of the total height of the elastic body in question when "n" individual bodies are arranged over the circumference of the wheel rim and have a width measured in the circumferential direction of between 40 and 70 mm in the non-pretensioned state. Depending on the diameter of the wheel, the width of the elastic bodies used (rubber elements) and the distance usually provided between the elastic bodies, in the case of wheel diameters of 400 to 800 mm normal in local transport rail vehicles, 9-34 elastic bodies arranged over the circumference are therefore required.

However, the radial spring stiffness of the wheel is strongly influenced by the pre-tensioning of the elastic bodies required in conventional track wheels. A high pre-tensioning accordingly leads to the radial stiffness of the wheel also increasing. In the case of conventional rubber sprung track wheels of the type in question here, the radial spring stiffness is accordingly in the range of 80-240 kN/mm.

However, for reasons of comfort, the lowest possible radial stiffness of the wheel is desired. In this manner, optimal damping behaviour of the track wheels is achieved. In order to achieve this, different wheel constructions have been proposed in the so-called two-ring embodiment, as they are described for example in U.S. Pat. No. 2,328,600 A or EP 1 896 274 B1. Track wheels designed in this manner have spring stiffnesses of 15 to 30 kN/mm. However, with the same load-bearing capacity, they require a significantly greater construction space for the rubber suspension than track wheels in the one-ring embodiments.

Against the background of this prior art, the object therefore emerged to provide a track wheel designed according to the one-ring concept with the potential for optimally low spring constants.

Furthermore, an elastic body ("rubber body") should also be indicated which, as an essential component for the spring properties, enables the manufacture of a one-ring track wheel with optimised use properties.

SUMMARY OF THE INVENTION

A multi-part track wheel according to the invention accordingly has a wheel tyre, a wheel rim and at least two elastic bodies arranged between the wheel tyre and the wheel rim via which the wheel tyre is supported spring elastically on the wheel rim and which are arranged distributed in the circumferential direction around the rotary axis of the track wheel, wherein the elastic bodies are clamped between an inner circumferential surface of the wheel tyre and an outer circumferential surface of the wheel rim and in this case abut with their outer side assigned to the wheel tyre on the inner circumferential surface of the wheel tyre and with their inner side assigned to the wheel rim on the outer circumferential surface of the wheel rim. According to the invention, the elastic bodies are in this case locked against a movement in the circumferential direction by forming elements provided in each case on the inner circumferential surface of the wheel tyre and/or on the outer circumferential surface of the wheel rim.

An elastic body for use in a track wheel comprising a wheel tyre and a wheel rim and at least two elastic bodies, via which the wheel tyre is supported spring elastically on the wheel rim, has a block-shaped base form with end side front sides of which in each case one is assigned to one of the front sides of the track wheel, longitudinal sides extending laterally between the front sides, an outer side assigned to the wheel tyre, also extending between the front sides and meeting at its longitudinal edges with the longitudinal sides and an inner side opposed to the outer side, which is assigned to the wheel rim of the track wheel. According to the invention, the elastic body is in this case provided on its outer side assigned to the wheel tyre with a forming element which is provided to interact in a positive-locking manner with a correspondingly shaped forming part on the inner circumferential surface of the wheel tyre.

An elastic body according to the invention is accordingly formed such that it is particularly suitable for use in a track wheel according to the invention. The elastic bodies provided in a rail vehicle according to the invention are therefore preferably designed in the manner independently explained here for the elastic bodies.

A space-saving design of a track wheel according to the one-ring wheel construction is possible with the configuration of a track wheel according to the invention, and this success is irrespective of whether the track wheel comprises only one wheel tyre and one wheel rim between which the respective elastic bodies are tensioned ("two-part embodiment) or whether a separate tension element is provided in addition to wheel tyre and wheel rim in order to tension the elastic bodies in a targeted manner (three-part embodiment). In this case, since in the case of a track wheel according to the invention the movement of the elastic bodies is locked in the circumferential direction by a positive-locking connection of the elastic bodies at least on the wheel tyre, the compression acting in the radial direction required to fix the elastic bodies between wheel tyre and rim is notably reduced compared to conventional track wheels. At the same time, the functional safety of the wheels according to the invention is at least equal with respect to the spring properties in the axial and tangential direction of conventional track wheels.

Unlike track wheels in which the connection of the wheel tyre to the wheel rim takes place exclusively by means of force fit via the elastic bodies arranged between wheel tyre and wheel rim and in which the elastic bodies have to be correspondingly highly compressed, in the case of a configuration according to the invention of an elastically sprung track wheel, the pre-tensioning of the elastic bodies unavoidably required to compensate the creep and subsidence effects and the measures, which are necessary for the transferability of the stresses occurring during operational use in the circumferential direction, are functionally separated.

Thus, the forces acting during the driving operation in the circumferential direction are substantially transferred by a positive-locking connection acting at least in the circumferential direction between the wheel tyre and the elastic bodies, on the one hand, or the wheel rim and the elastic bodies, on the other hand. To this end, in the case of a wheel according to the invention, suitable forming elements are provided on the wheel tyre or the wheel rim and the elastic bodies. In this manner, a form closure is generated in the circumferential direction between the rubber elements and the surrounding components consisting of metallic materials with which the secure transfer of all occurring stresses during operational use is ensured.

In the case of a track wheel according to the invention, a pre-tensioning of the elastic bodies is therefore only required in order to compensate the unavoidable creep and subsidence effects with a sufficient safety loading. By means of this pre-tensioning, which is notably reduced in this manner compared to conventional track wheels, the radial deflection under the wheel contact force is correspondingly notably increased in the case of a track wheel according to the invention. It is shown here that in the case of otherwise identical construction for the radial spring stiffnesses $c_{wheel.new}$ of the wheel embodiments according to the invention the following applies in relation to the spring stiffnesses $c_{wheel.standard}$ of the conventional wheel embodiments:

$$c_{wheel.new} = 0.4 \ldots 0.8\ c_{wheel.standard}$$

In this case, the elastic bodies in a track wheel according to the invention typically are compressed by a value of Hv compared to the non-deformed new state, which corresponds to 0.07-0.29 of their height HgK in the non-deformed new state. Therefore, the height HvK of the elastic bodies in the state clamped between wheel tyre and wheel rim is lower by 7-29% than their height HgK in the fully unloaded new state (Hv=0.07 . . . 0.29 HgK).

Essentially, all forming elements formed on the inner circumferential surface of the wheel tyre of a track wheel according to the invention which can be placed in the way of a movement of the elastic bodies in the circumferential direction are suitable for the purposes according to the invention. This can be depressions into which the material of the elastic bodies is pressed owing to the necessary pre-tensioning of the elastic bodies or it may be projections against which the elastic bodies are supported in the circumferential direction.

It has been proven to be particularly effective in this respect when a number of the elastic bodies have, on their outer side or inner side, at least one forming element, which interacts at least in the circumferential direction in a positive-locking manner with one of the forming elements present on the inner circumferential surface of the wheel tyre or the outer circumferential side of the wheel rim. By means of the shaping, adapted to one another, of the forming elements interacting in a positive-locking manner and the elastic bodies, provided therewith, and wheel rim or wheel tyre, an optimally secure positive-locking support of the elastic bodies is achieved and therefore maximum safety against displacement of the elastic bodies under the load of the forces occurring during the driving operation is achieved.

In this case, with respect to a connection of the wheel tyre on the wheel rim, which is optimally secured against displacement, it is advantageous but not absolutely necessary for all elastic bodies to be equipped in each case with a forming element, which interacts with a correspondingly shaped forming element on the wheel tyre or on the wheel rim. In fact, viewed in the circumferential direction, at least one elastic body can in each case be arranged between two elastic bodies provided with a forming element on the inner circumferential surface of the wheel rim or the outer circumferential surface of the wheel tyre for the positive-locking interaction, in the case of which such a forming element is missing. It is shown here that even if at least 20% of the elastic bodies of a track wheel according to the invention are supported in the manner according to the invention via forming elements, interacting with one another, on the wheel tyre or the wheel rim, a permanent relative rotation can be prevented between wheel tyre and wheel rim. Thus, in the case of track wheels with nine elastic bodies, at least two bodies, and in the case of a track wheel with 34 elastic bodies, at least seven elastic bodies should be connected in the manner according to the invention to the wheel tyre or the wheel rim, and it of course goes without saying that the correspondingly connected bodies are optimally arranged at even angular distances distributed around the rotary axis of the track wheel.

A particularly effective connection of the wheel tyre to the elastic bodies and via these to the wheel rim results when the forming elements provided on the inner surface of the wheel tyre have recesses formed into the inner circumferential surface and in each case at least one projection interacting in a positive-locking manner with one of these recesses is present as the forming element on the outer side of the elastic bodies provided with such a forming element. By means of this shaping, adapted to one another, of the forming elements provided for the form closure, an optimally positive-locking connection of the bodies provided with the forming element to the wheel tyres is ensured.

The forming elements provided on the elastic body according to the invention and interacting with in each case one recess on the inner circumferential surface of the wheel tyre can in this case for example have a circular, parabolic, triangular, trapezoidal or curved cross-section, and it has been found to be advantageous with respect to the manufacture of the correspondingly shaped recesses on the inner circumferential surface of the wheel tyre for the cross-sectional shape to be based on a rotationally-symmetric figure, i.e. a circular shape, an ellipse or the like.

The recess on the inner circumferential surface of the wheel tyre and the assigned forming element on the outer side of the respective elastic body should be dimensioned such that a certain clearance is present in the circumferential direction between the inner circumferential surfaces of the receiving portion and the forming element on the outer side of the elastic body in the case of the untensioned elastic body. The free space formed by this clearance is filled with material of the elastic body when tensioned. The development of local maximum loadings, which could lead to premature material fatigue, is thus avoided by the previously present clearance.

In the case of the semi-circular shaped cross-sectional design of the forming element provided on the elastic body and the assigned recess formed on the inner circumferential surface of the wheel tyre, the cross-sectional radius rH of the forming element and the cross-sectional radius rA of the recess can be matched to one another for example as follows:

$$rH = 0.75 \ldots 0.98 \, rA$$

Seat surfaces for the elastic bodies can be formed on the outer circumferential surface of the wheel rim for rotation-proof connection of the elastic bodies to the wheel rim.

These seat surfaces can be formed flat such that in the case of this configuration the outer circumferential surface of the wheel rim has a polygon with a number of side surfaces corresponding to the number of the elastic bodies provided.

The seat, secured against displacement, of the elastic body on the outer circumferential surface of the wheel rim can, however, also be supported by the seat surfaces being formed in depressions formed into the outer circumferential surface of the wheel rim. The material of the elastic bodies is set into these depressions such that in the course of the installation of the elastic bodies and their associated pre-tensioning, a positive-locking connection of the bodies on the wheel rim is set. This can be supported by the depressions being delimited by side surfaces which form a spatial polygon and together form the respective seat surface. In this case, it has been found to be favourable for the durability of the elastic bodies for the side surfaces delimiting the depressions to be vaulted.

Irrespective of the shaping obtained by the seat surfaces provided for the elastic bodies on the outer circumferential surface of the wheel rim, a displacement of the elastic bodies in the circumferential direction can also be particularly effectively prevented on the wheel rim as a result of the seat surfaces being delimited by webs which are aligned axially-parallel to the rotary axis of the track wheel.

In this case, the webs can be formed in one piece on the wheel rim, i.e. produced in one piece with the rim from the material of which the rim consists. To this end, any suitable primary shaping or machining methods can for example be used. Alternatively or additionally, it is also possible to separately prefabricate the webs delimiting the seat surfaces in the circumferential direction and to fasten them on the outer circumferential surface of the wheel rim by means of suitable connection techniques, such as screws, rivets, clinches, welding, soldering, shrinking, adhering.

Alternatively to fastening directly on the inner circumferential surface, it is also possible to form the webs by boundary elements held on the wheel rim. These boundary elements can be pins or bolts which are held for example on shoulders of the wheel rim circulating on the front side. For this purpose, receiving portions, for example through openings, arranged opposing one another on the shoulders in question, can be provided through which the boundary elements are inserted. The boundary elements are optimally shaped such that they are held by form closure acting in their circumferential direction in the respective receiving portion in a rotation proof manner. To this end, the boundary elements can have a cross-sectional shape deviating from a circle at least in the region in which they come into engagement with the respective receiving portion. Similarly, the boundary elements should be arranged or shaped such that the abrasive loading of the elastic bodies coming into contact with them is minimised. To this end, the contact surfaces of the boundary elements can be formed vaulted and, if present, the edges between the surfaces of the boundary elements can be rounded.

The arrangement of the boundary elements can be carried out equally between all elastic bodies or even in a reduced number, with the number of boundary elements being at least three. Similarly, it has proven to be advantageous in this case to arrange the boundary elements distributed at regular angular distances around the rotary axis of track wheel.

It also applies in relation to the design of the seat surfaces provided on the outer circumferential surface of the wheel rim that not all of the seat surfaces have to be formed such that it necessarily results in a form closure acting in the circumferential direction of the track wheel. In fact, it may be sufficient for the number of seat surfaces delimited by webs in the circumferential direction to correspond to at least 20% of the number of the elastic bodies provided for the respective track wheel according to the invention, with a seat surface delimited by webs on the circumferential side being optimally assigned to each elastic body which is connected in a positive-locking manner to the inner circumferential surface of the wheel tyre via a correspondingly shaped forming element.

Optimal spring properties result when the elastic bodies used for a track wheel according to the invention consist of an elastomer material with a shore hardness of 65 to 89 ShA. Such elastomer materials have been long known from the field of manufacture of elastic bodies ("rubber elements") for the construction of conventional track wheels of the type explained at the outset. Suitable materials consist e.g. of natural rubber (NR), ethylene propylene rubber diene monomer (EPDM), chloroprene rubber (CR) or hydrogenated nitrile butadiene rubber (HNBR).

An elastic body according to the invention provided in particular for use in a track wheel according to the invention is shaped with the forming element formed on its outer side assigned to the inner circumferential surface of the wheel tyre such that it allows a secure transfer of the forces occurring during operation between wheel tyre and rubber elements by way of the form closure by engaging in the state mounted for use into correspondingly shaped recesses in the inner circumferential surface of the wheel tyre.

In particular in the case of wheel tyres, whose inner circumferential surface does not run consistently axially-parallel around the rotary axis of the track wheel, but rather which, viewed in the longitudinal section axially-parallel to the rotary axis of the track wheel, for example has a triangular shape with surface sections running in relation to one another in the manner of a pitched roof in the direction of the centre of the inner circumferential surface and in the direction of the rotary axis or has a section shaped in a different manner and running around the rotary axis of the track wheel at least in sections, has been proven to be particularly favourable when the elastic body has in each case an end section on its opposing ends, in each case viewed in the axial direction aligned axially-parallel to the rotary axis of the track wheel, and a trough is formed between the end sections into the outer side of the elastic body on whose base a projection forming the forming element of the elastic body is established. In the case of elastic bodies formed in this manner, it is sufficient for the respective recess, interacting with the projection of the elastic body, of the inner circumferential surface of the wheel tyre to be formed in the region of the inner circumferential surface protruding in the direction of the rotary axis and running out in the axial direction into the circumferential, front side-edge regions of the inner circumferential surface. In the elastic body completely mounted for use in the track wheel, the positive-locking connection takes place via the projection engaging into the respective recess on the inner circumferential surface of the wheel tyre, while the end sections of the elastic body are simultaneously supported against the respective edge region of the inner circumferential surface and accommodate the section of the inner circumferential surface protruding in the direction of the rotary axis between them. In this manner, not only can securing against a relative rotation of wheel tyre and wheel rim in the circumferential direction be achieved via the elastic bodies, but similarly wheel tyre and wheel rim can be effectively prevented from displacing towards one another in the axial direction during use. Depending on the shaping of the inner circumferential surface of the wheel tyre or the recess formed on it and interacting with the projection of the elastic body according to the invention, it may prove expedient with respect to a maximising of the transfer of loadings occurring during use when the projection extends in the axial direction between the end sections of the respective elastic body. For the reasons already explained above, it has proven particularly favourable for the projection to be formed in a semi-circular shape viewed in a section transverse to the axial direction. A notch effect in the region of the transition from the end sections to the projection or trough of the elastic body can be effectively counteracted here as a result of the slopes, with which the end sections merge into the trough delimited between them, are continuously curved without cracks.

In order to achieve their necessary pre-tensioning in the completely mounted track wheel according to the invention, elastic bodies according to the invention are compressed during mounting, as explained above, unavoidably in the radial direction of the track wheel, i.e. in the direction of their height. The danger of a laterally spherically bulged shape of the elastic bodies being set as a result of the compression, which could impair their spring effect, can be counteracted by the longitudinal sides of the elastic bodies being vaulted in the unloaded new state.

The design options described here of track wheels and elastic bodies according to the invention for use in such track wheels can be implemented for all known track wheel construction types of the one-ring embodiments and lead in each case to a noticeable increase in the comfort properties of the wheels.

BRIEF DESCRIPTION OF THE DRAWINGS

The invention is explained in greater detail below based on a drawing representing exemplary embodiments. They show in each case schematically in.

DESCRIPTION OF THE INVENTION

Figure 1:
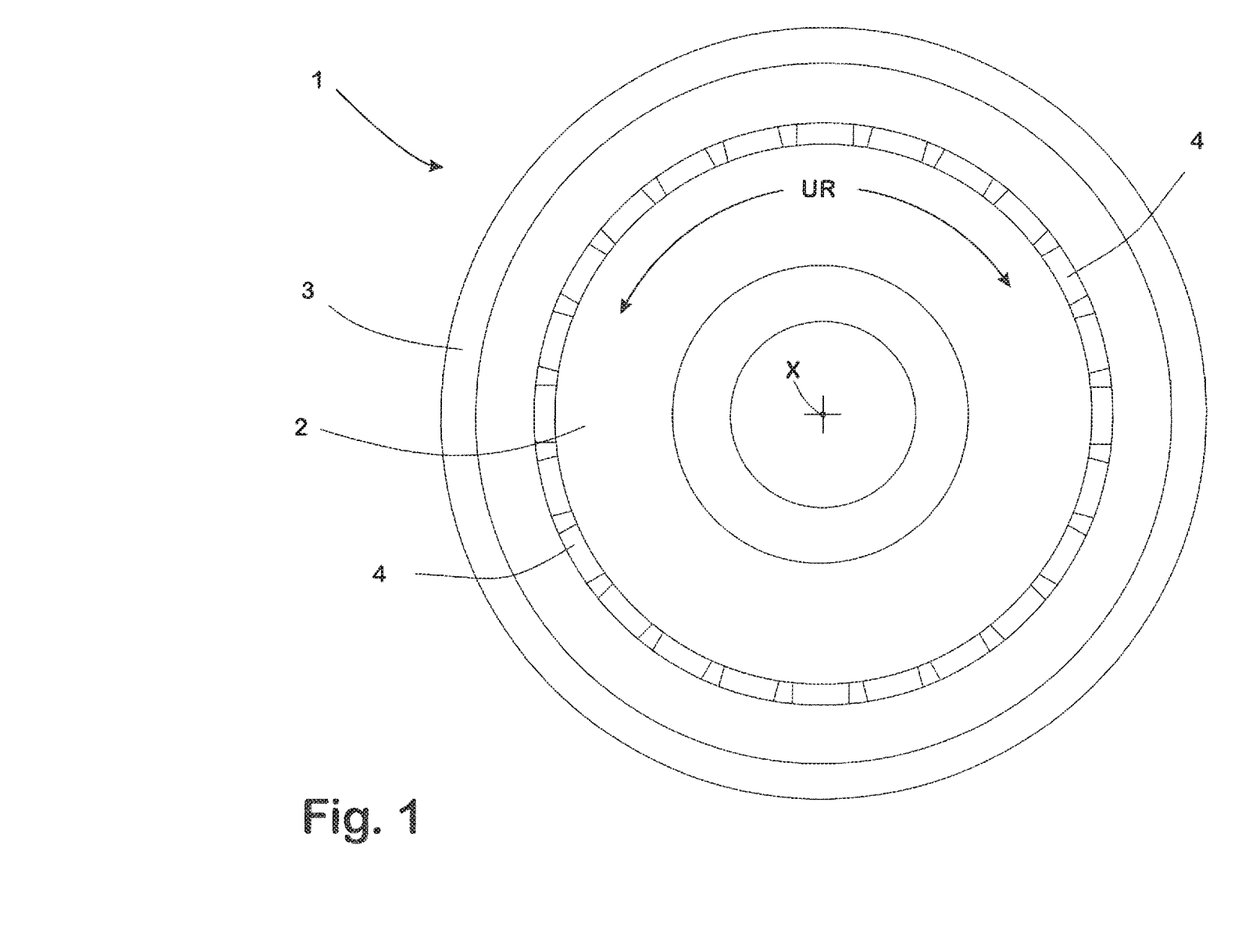
FIG. 1 a track wheel in frontal view.

The track wheel 1 represented in FIG. 1 comprises a wheel rim 2 and a wheel tyre 3, which is supported via elastic bodies 4 arranged between the wheel rim 2 and the wheel tyre 3. The elastic bodies 4 are also arranged distributed at even angular distances around the central rotary axis X of the track wheel 1 in the gap present between the wheel rim 2 and the wheel tyre 3.

Figure 10A:
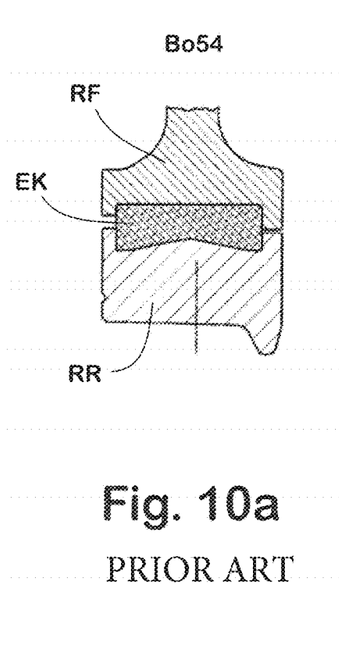
FIG. 10a-10d cut-outs of different track wheels in conventional constructions in each case in a longitudinal section.
Figure 10B:
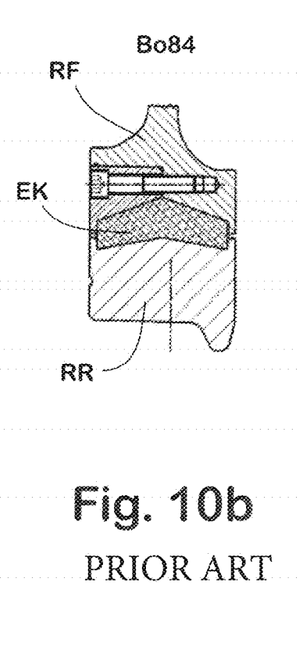
Figure 10C:
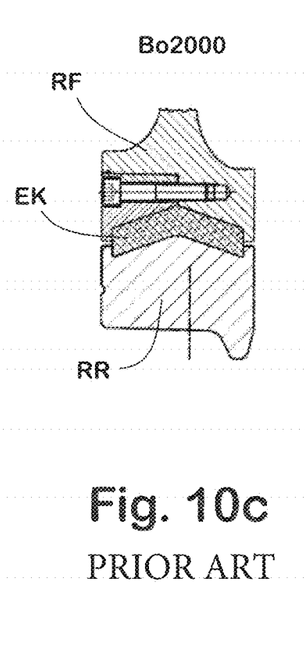
Figure 10D:
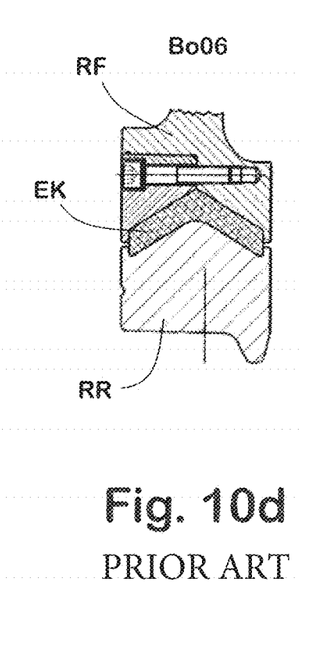

The base structure of the track wheel 1 corresponds to the "two-part" structure of a track wheel known under the designation "BO54" and offered by the applicant, whose longitudinal section is represented in sections in FIG. 10a. The elastic bodies EK are pressed there between the wheel tyre RR and the wheel rim RF such that the wheel tyre RR is fixed in the circumferential direction UR by the pressure forces acting in the radial direction RR in a force-fitting manner on the wheel rim RF. At the same time, the elastic bodies EK are secured against displacement in the axial AR direction by a shoulder 30, 31 circulating in each case around the respective front side-edge of the wheel rim RF. The three other known track wheels "BO84", "BO2000" and BO06" shown in FIGS. 10b, 10c and 10d and also offered by the applicant are variants of three-part track wheels in the case of which, in addition to the wheel tyre and the wheel rim, a tension ring for pre-tensioning the elastic bodies supporting the wheel tyre on the wheel rim is provided as a third element consisting of metal. The radial spring stiffness is in the case of the track wheel BO54 roughly 80 kN/mm, in the case of the track wheel BO84 roughly 100 kN/mm, in the case of the track wheel BO2000 roughly 200 kN/mm and in the case of the track wheel BO06 roughly 240 kN/mm.

The elastic bodies 4 consist of an elastomer material that has proven reliable for this purpose in practice, e.g. made of natural rubber (NR) with a shore hardness of 65-88 ShA and are shaped in each case in one piece.

Figure 2:
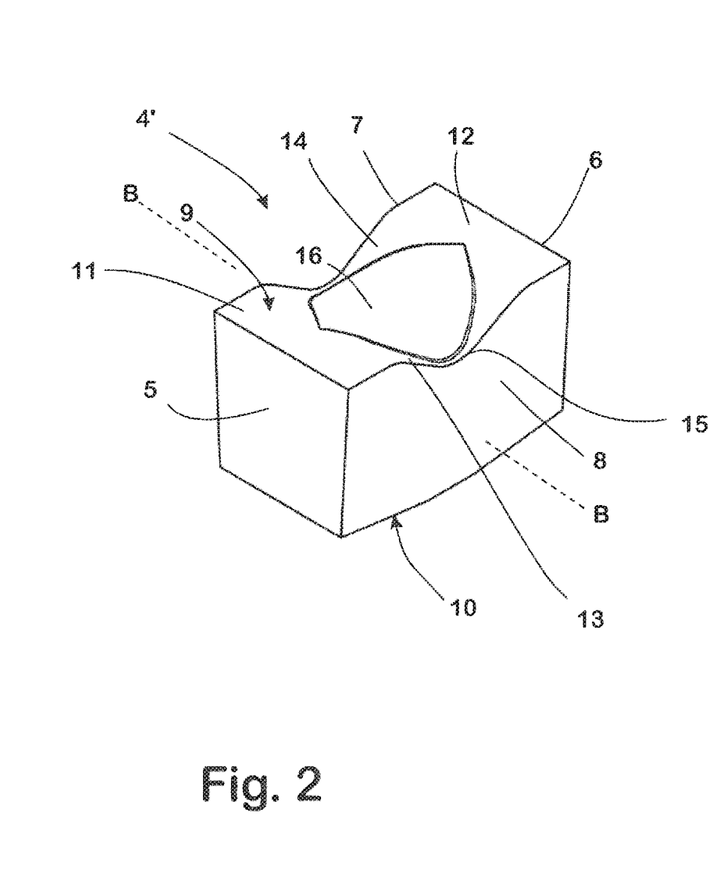
FIG. 2 a first elastic body in perspective view from above.
Figure 3:
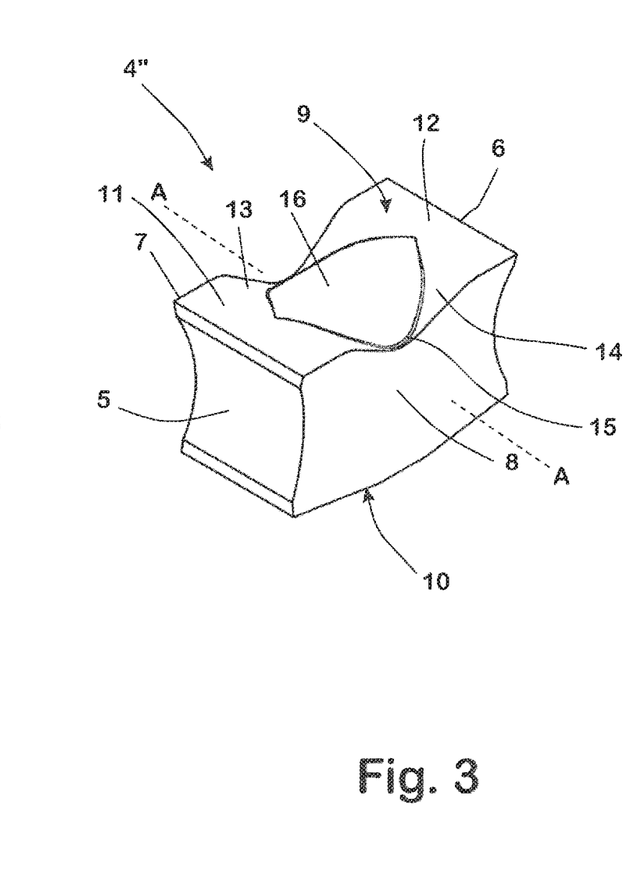
FIG. 3 a second elastic body in perspective view from above.

As represented for their two variants 4' and 4" shown in FIGS. 2 and 3, the elastic bodies 4 in each case have a square-shaped base form with two end side front sides 5, 6 opposite one another of which in each case one is assigned to one of the front sides of the track wheel 1, with two longitudinal sides 7, 8 extending laterally between the front sides 5, 6, with an outer side 9 assigned to the wheel tyre 3, also extending between the front sides 5, 6 and meeting at its longitudinal edges with the longitudinal sides 7, 8 and an inner side 10 opposed to the outer side 9, which is assigned to the wheel rim 2 of the track wheel 1.

An end section 11, 12 is in each case formed adjoining the front sides 5, 6 on the outer side 9 of the elastic bodies 4', 4", which in each case merges in a continuously crack-free curved slope 13, 14 into a trough 15 delimited by the end sections 11, 12.

Figure 4A:
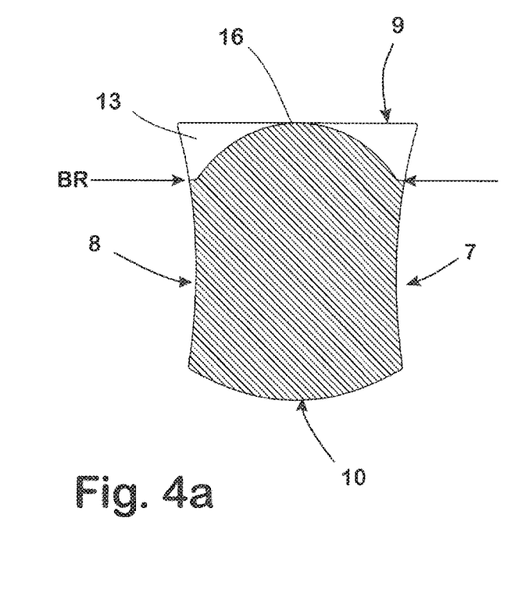
FIG. 4a the elastic body according to FIG. 3 in a section along the section line A-A drawn into FIG. 3.
Figure 4B:
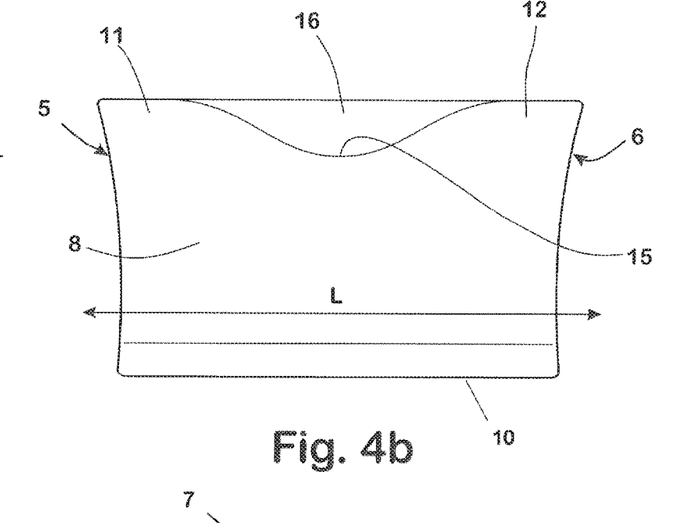
FIG. 4b the elastic body according to FIG. 3 in a side view.
Figure 4C:
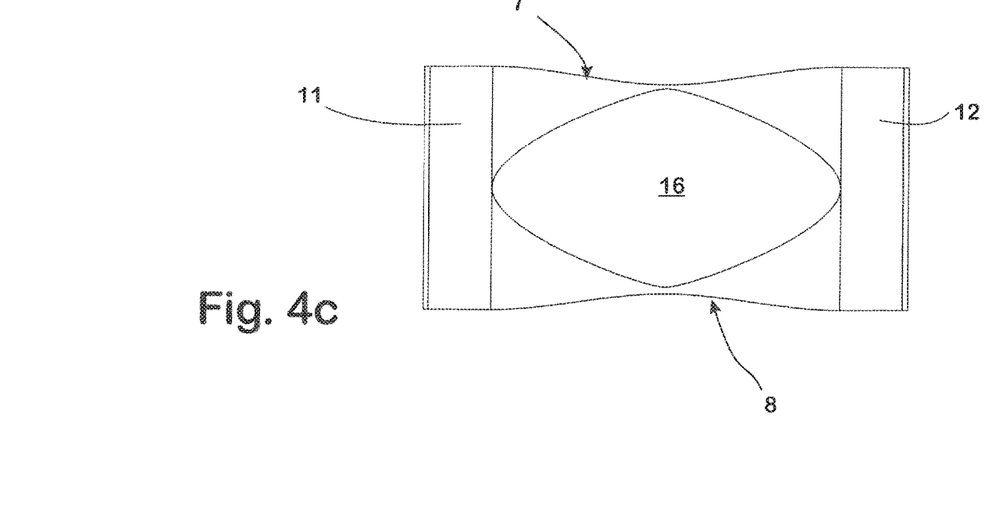
FIG. 4c the elastic body according to FIG. 3 in a plan view from above.

Proceeding from the base of the trough 15, a forming element 16 is formed in the shape of a projection extending in the longitudinal direction L of the respective elastic body 4', 4". The forming element 16 in this case has the shape of a half cylinder with a semi-circular shaped cross-sectional shape (FIG. 4) and takes in the width BR of the elastic body 4', 4" in the region of the deepest point of the trough 15 up to a small undersize.

Figure 8:
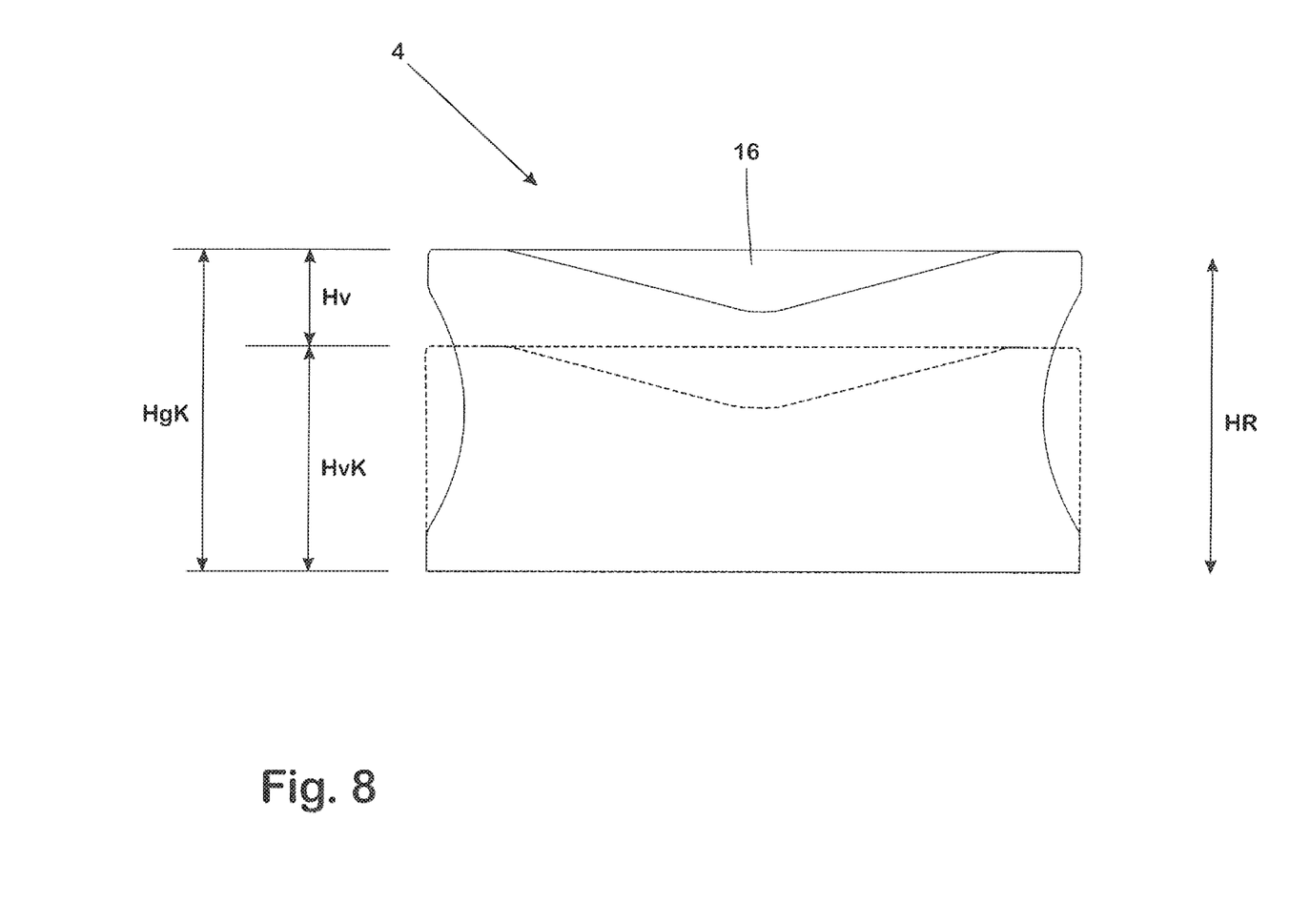
FIG. 8 the elastic body according to FIG. 2 in the uncompressed new state (solid lines) and in the compressed installation state (dashed lines) in each case in side view.

In the case of the installation, the elastic bodies 4 are compressed in the vertical direction HR such that their height HvK in the completely mounted state is shorter by a height value Hv than their height HgK in the uncompressed new state (FIG. 8). Irrespective of which variant 4', 4" is installed, the height HvK of the completely mounted elastic body 4 is roughly 71-93% of the height HgK (Hv=0.07 . . . 0.29 HgK).

In order to receive material displaced during this compression and to ensure a substantially block-shaped design in the case of the completely mounted elastic bodies 4, the longitudinal sides 7, 8 and the front sides 5, 6 are slightly vaulted in each case in the new state in the case of variant 4". As a result of the tensioning, the elastic bodies 4 designed according to variant 4" are deformed such that their longitudinal sides 7, 8 and front sides 5, 6 are shaped substantially straight and flat and optimal spring properties are ensured.

Figure 5:
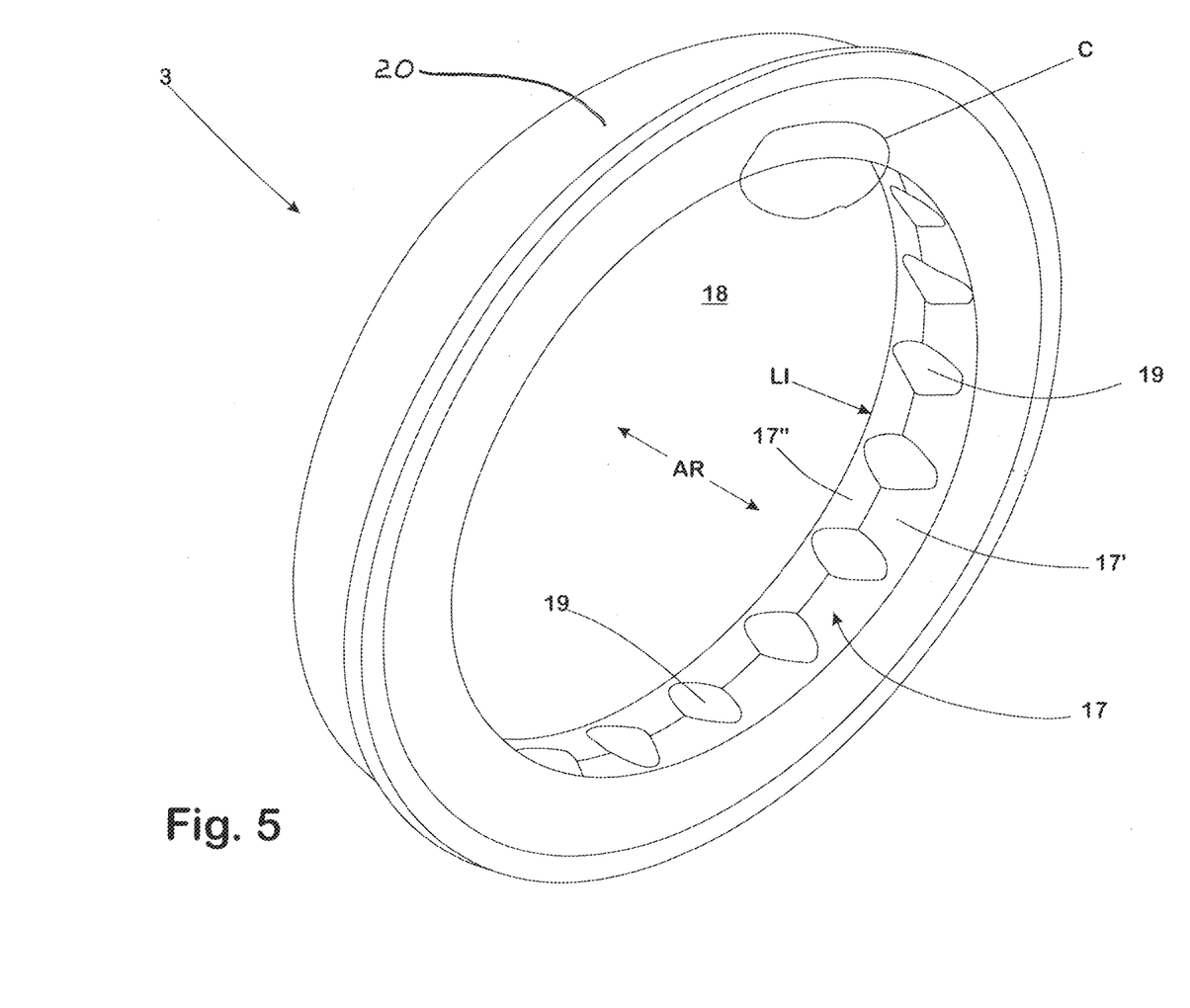
FIG. 5 a wheel tyre of the track wheel represented in FIG. 1 in a perspective view.
Figure 7:
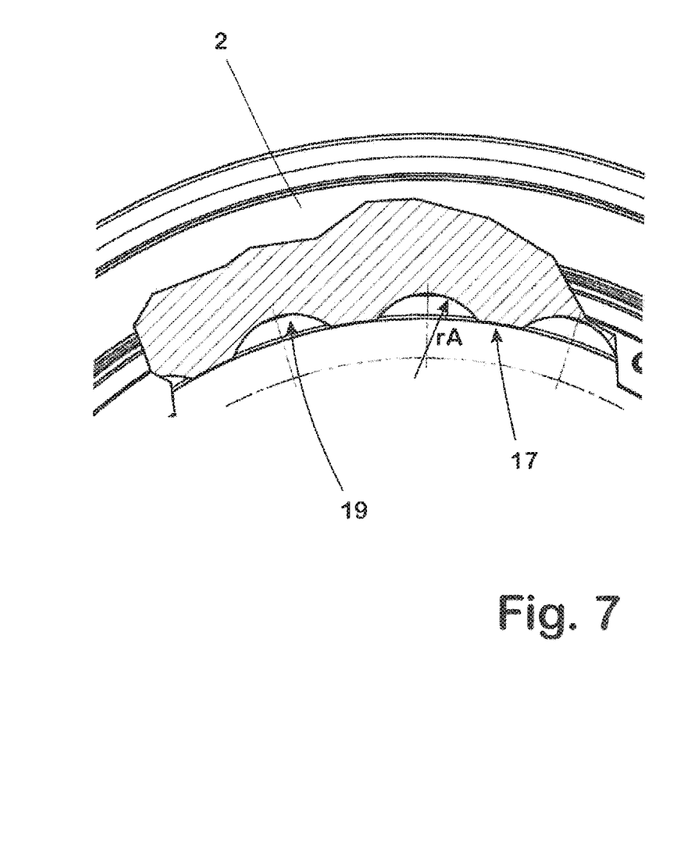
FIG. 7 a partially interrupted cut-out C of the wheel tyre represented in FIG. 5 in a frontal view.

The wheel tyre 3 is shaped from a steel material proven for this purpose in practice and has an inner circumferential surface 17 which is subdivided into two circulating edge regions 17', 17". The edge regions 17', 17" run in each case starting from the front side of the wheel tyre 3 assigned to them in each case in a pitched roof manner towards one another and meet in the centre of the length LI of the inner circumferential surface 17 measured in the axial direction AR. Channel-shaped recesses 19 shaped in the manner of a cylinder half shell are formed at regular angular distances into the protrusion formed on the inner circumference of the opening 18 enclosed by the wheel tyre 3 and circulating around the opening 18, said recesses extending in the axial direction AR over the length LI of the inner circumferential surface 17 and whose depth is selected such that the channel-shaped recesses 19 run out close to the respective front side of the wheel tyre 3 with their front side ends.

Figure 6:
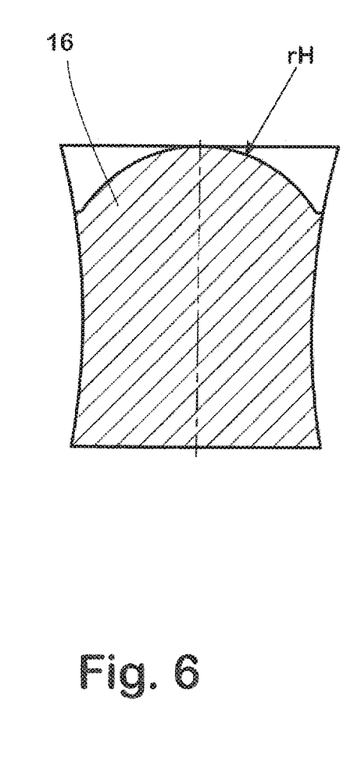
FIG. 6 the elastic body according to FIG. 2 in a section along the section line B-B drawn into FIG. 2.

The cross-sectional radius rH of the forming element 16 (FIG. 6) provided in each case on the elastic bodies 4 and the cross-sectional radius rA of the recess 19 are matched to one another such that they meet the condition 0.75 rA≤rH≤0.98 rA. In this manner, in the case of the uncompressed elastic bodies 4, there is lateral clearance between their forming elements 16 and the recesses 19, said lateral clearance being filled by the material of the forming element when the elastic bodies 4 are compressed between the wheel tyre 3 and the wheel rim 2.

Seat surfaces 21 are formed on the outer circumferential surface 20 of the wheel rim 2 at angular distances corresponding to the arrangement of the recesses 19.

Figure 9A:
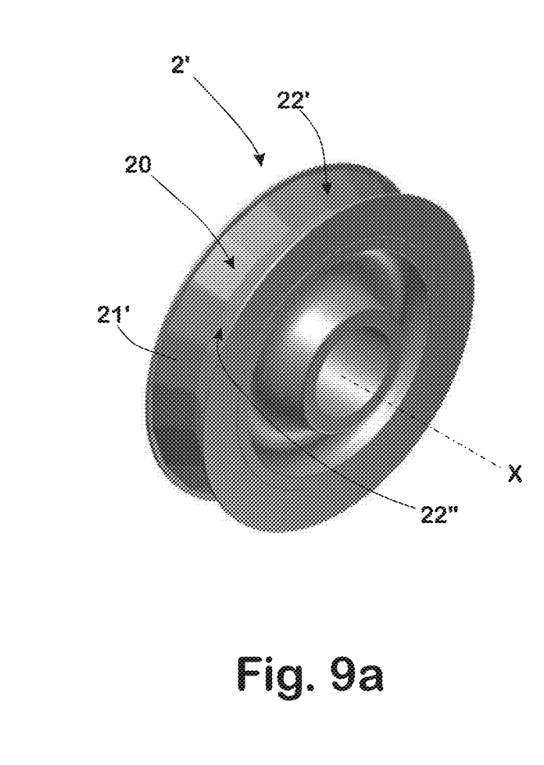
FIG. 9a-9c variants of wheel rims of the track wheel represented in FIG. 1 in each case in perspective view.

In the case of the variant 2' of the wheel rim 2 shown in FIG. 9a, the seat surfaces 21' are formed as flat surfaces which abut on one another in each case in a border such that the outer circumferential surface 20 has a polygonal design in this variant 2'. In this case, the outer circumferential surfaces 20' and with them the seat surfaces 21' are in each case divided into two edge regions 22', 22" which run towards one another in a V shape in the direction of the rotary axis X of the track wheel 1.

Figure 9B:
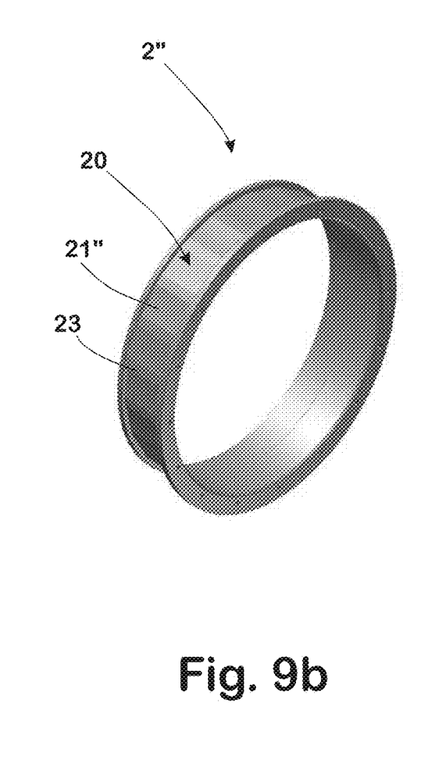

In the case of the variant 2" of the wheel rim 2 shown in FIG. 9b, the seat surfaces 21" are formed, in contrast, as flat surfaces aligned axially-parallel to the rotary axis X, which are in each case separated from one another by an border region 23. The inner circumferential surface 17 also consequently has a polygonal design here.

Figure 9C:
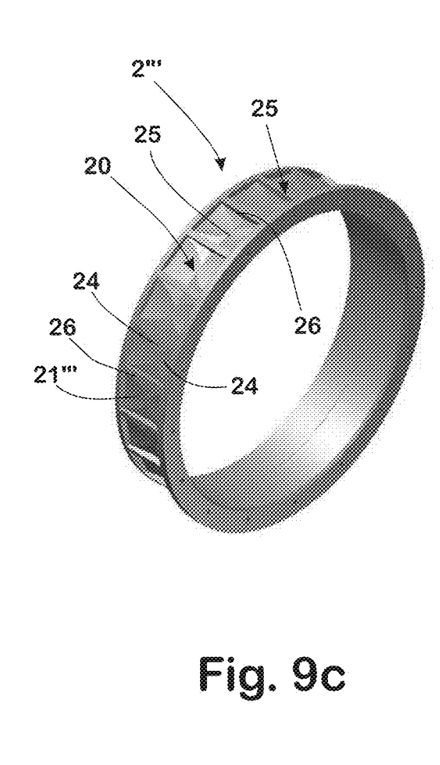

In the case of the variant 2''' of the wheel rim 2 shown in FIG. 9c, the seat surfaces 21''' are formed by the side surfaces 24 of recesses 25 formed into the material of the wheel rim 2. The four side surfaces 24 are shaped and aligned such that they form a spatial polygon directed into the material of the wheel rim 2 and together form the respective seat surface 21'''. In this case, the side surfaces 24 aligned opposite one another in the axial direction AR are vaulted in order to achieve the most secure and centred seat of the respective elastic body 4 on the seat surface 2'''.

In the case of the variant 2''' of the wheel rim 2, webs 26 are in each case provided between the recesses 25, which extend axially-parallel to the rotary axis X and delimit the recesses 25 in the manner of compartments. The webs 26, in this manner, form stops by means of which the elastic bodies 4 in each case sitting in the recesses 25 are fixed in the axial direction AR and circumferential direction UR.

Figure 11:
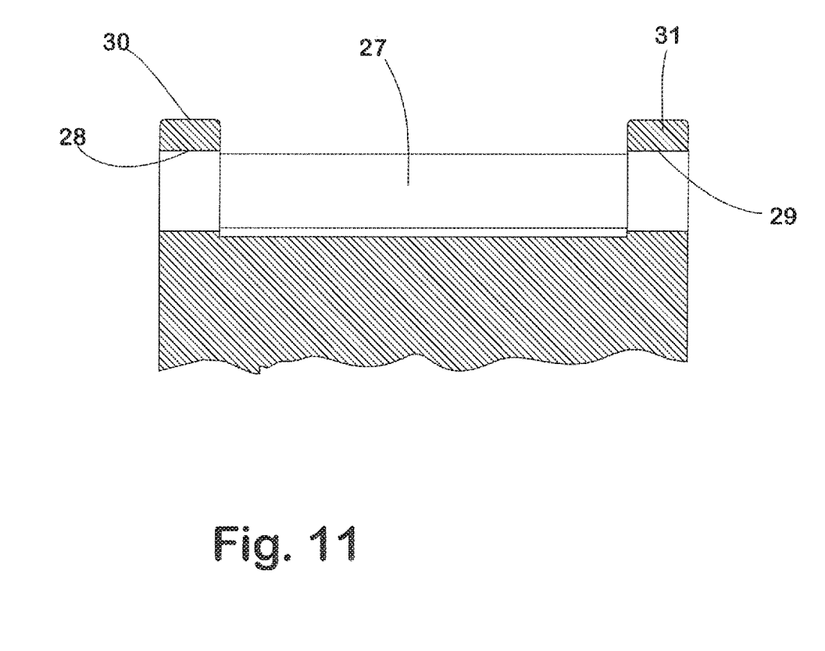
FIG. 11 a cut-out of a wheel rim in a longitudinal section.
Figure 12:
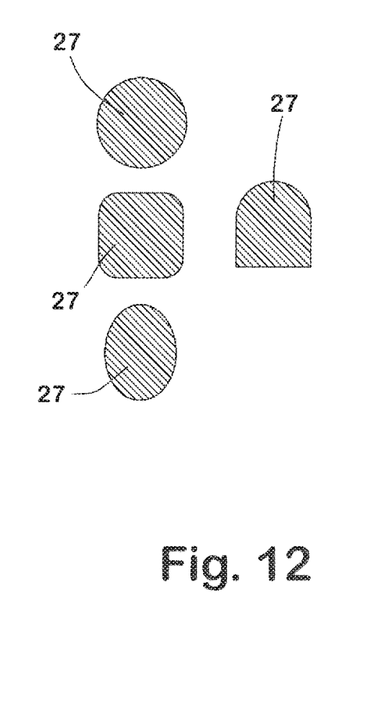
FIG. 12 cross-sectional shapes of boundary elements.

Alternatively, the webs can also be formed by locking pins serving as boundary elements 27, which are inserted through recesses 28, 29 formed as through openings in order to be inserted into shoulders 30, 31 circulating the front side edges of the outer circumferential surface 20. The boundary elements 27 are optimally shaped such that they have a minimised notch effect in the region of their contact surface with the elastic bodies 4 supported thereon in each case. To this end, they can have a rounded, circular or ellipsoid cross-sectional shape (FIG. 12).

If the wheel rims, the wheel tyres and the elastic bodies are reconstructed in the case of the known track wheel constructions BO54, BO84, BO2000 and BO06 (see FIGS. 10a-10d) in the manner according to the invention explained above, a reduction of the spring stiffness by up to 60% can be achieved with unchanged high protection against rotation of the wheel tyre relative to the wheel rim taking place in the circumferential direction.

REFERENCE NUMERALS 1 track wheel
2 wheel rim
2',2'',2''' variants of the wheel rim 2
3 wheel tyre
4 elastic body
4',4'' variants of the elastic body 4
5,6 front sides of the elastic body 4
7,8 longitudinal sides of the elastic body 4
9 outer side of the elastic body 4
10 inner side of the elastic body 4
11,12 end sections of the elastic body 4
13,14 slopes of the elastic body 4
15 trough
16 forming element (projection)
17 inner circumferential surface
17',17'' circulating edge regions of the inner circumferential surface 17
18 opening enclosed by the wheel tyre 3
19 recesses
20 outer circumferential surface of the wheel rim 2
21 seat surfaces
21',21'',21''' variants of the seat surface 21
22',22'' edge regions
23 border region
24 side surfaces
25 recesses (depressions)
26 webs
27 boundary elements
28,29 recesses
30,31 shoulders
AR axial direction
BR width of the elastic body 4
EK elastic body
RR wheel tyre
RF wheel rim
HR vertical direction
HvK height of the elastic body 4 in the completely mounted state
Hv height value
HgK height of the elastic body 4 in the uncompressed new state
L longitudinal direction of the elastic body 4
LI length of the inner circumferential surface 17
rA cross-sectional radius of the recess 19
rH cross-sectional radius of the forming element 16
UR circumferential direction
X central rotary axis of the track wheel 1

The invention claimed is:

1. A multi-part track wheel with a wheel tyre, with a wheel rim and with at least two elastic bodies arranged between the wheel tyre and the wheel rim, through which the wheel tyre is supported elastically on the wheel rim and which are arranged in the circumferential direction around the rotary axis of the track wheel, wherein the elastic bodies are clamped between an inner circumferential surface of the wheel tyre and an outer circumferential surface of the wheel rim and abut with outer sides of the elastic bodies assigned to the wheel tyre on the inner circumferential surface of the wheel tyre and with inner sides of the elastic bodies assigned to the wheel rim on the outer circumferential surface of the wheel rim, wherein the elastic bodies are locked against a movement in the circumferential direction by forming elements provided on the inner circumferential surface of the wheel tyre and/or on the outer circumferential surface of the wheel rim, wherein a number of the elastic bodies have, on the outer side or inner side of the elastic bodies, at least one forming element, which interacts at least in the circumferential direction in a positive-locking manner with one of the forming elements present on the inner circumferential surface of the wheel tyre or the outer circumferential surface of the wheel rim;

wherein each of the at least two elastic bodies has one end section on the ends of the elastic body viewed in opposition to the axial direction aligned axially-parallel to the rotary axis of the track wheel and in that a trough is formed between the end sections into the outer side of each of the at least two elastic bodies on whose base a projection forming the forming element of each of the at least two elastic bodies is established.

2. The track wheel according to claim 1, wherein at least 20% of the elastic bodies are provided on the outer sides of the elastic bodies with the forming element.

3. The track wheel according to claim 1, wherein the forming elements provided on the inner circumferential surface of the wheel tyre are recesses formed into the inner circumferential surface and at least one projection interacting in a positive-locking manner with one of these recesses is present as the forming element on the outer side of the elastic bodies provided with such a forming element.

4. The track wheel according to claim 1, wherein seat surfaces for the elastic bodies are formed on the outer circumferential surface of the wheel rim.

5. The track wheel according to claim 4, wherein the seat surfaces are delimited by webs which are aligned axially-parallel to the rotary axis of the track wheel.

6. The track wheel according to claim 5, wherein the webs are formed by boundary elements held on the wheel rim.

7. The track wheel according to claim 4, wherein the seat surfaces are arranged in depressions formed into the outer circumferential surface of the wheel rim.

8. The track wheel according to claim 7, wherein the depressions are delimited by side surfaces, which form a spatial polygon and together form the respective seat surface.

9. The track wheel according to claim 7, wherein the side surfaces delimiting the depressions are vaulted.

10. The track wheel according to claim 1, wherein the height of the elastic bodies is lower by 7-29% in the state clamped between the wheel tyre and wheel rim than the height of the elastic bodies in the fully unloaded new state.

11. The track wheel according to claim 1, wherein the elastic bodies consist of an elastomer material with a shore hardness of 65 to 89 ShA.

12. Elastic bodies for use in a track wheel comprising a wheel tyre and a wheel rim and at least two elastic bodies, through which the wheel tyre is elastically supported by a spring on the wheel rim, wherein the elastic body has a block-shaped base form with end side front sides of which one is assigned to one of the front sides of the track wheel, longitudinal sides extending laterally between the front sides, an outer side assigned to the wheel tyre, also extending between the front sides and meeting at longitudinal edges of the outer side with the longitudinal sides and an inner side opposed to the outer side, which is assigned to the wheel rim of the track wheel, wherein the elastic body is provided, on the outer side of the elastic body assigned to the wheel tyre, with a forming element, which is provided to interact with a correspondingly shaped forming part on the inner circumferential surface of the wheel tyre in a positive-locking manner;

wherein each of the at least two elastic bodies has one end section on the ends of the elastic body viewed in opposition to the axial direction aligned axially-parallel to the rotary axis of the track wheel and in that a trough is formed between the end sections into the outer side of each of the at least two elastic bodies on whose base a projection forming the forming element of each of the at least two elastic bodies is established.

13. The elastic body according to claim 12, wherein the projection extends in the axial direction between the end sections of the respective elastic body.

14. The elastic body according to claim 12, wherein the projection is formed in a semi-circular shape viewed in a section transverse to the axial direction.

15. The elastic body according to claim 12, wherein the slopes, with which the end sections merge into the trough delimited between the slopes, are curved continuously without cracks.

16. The elastic body according to claim 14, wherein the longitudinal sides of the elastic body are vaulted.

* * * * *